(12) United States Patent
Farine et al.

(10) Patent No.: US 6,912,242 B2
(45) Date of Patent: Jun. 28, 2005

(54) LOW POWER RF RECEIVER WITH REDISTRIBUTION OF SYNCHRONISATION TASKS

(75) Inventors: Pierre-André Farine, Neuchâtel (CH); Jean-Daniel Etienne, Les Geneveys-sur-Coffrane (CH); Ruud Riem-Vis, Neuchâtel (CH); Elham Firouzi, Ligerz (CH)

(73) Assignee: Asulab S.A., Marin (CH)

(*) Notice: Subject to any disclaimer, the term of this patent is extended or adjusted under 35 U.S.C. 154(b) by 804 days.

(21) Appl. No.: 09/886,025

(22) Filed: Jun. 22, 2001

(65) Prior Publication Data
US 2002/0004392 A1 Jan. 10, 2002

(30) Foreign Application Priority Data
Jul. 4, 2000 (CH) ............................................. 1322/00

(51) Int. Cl.[7] .......................... H04B 1/69; H04B 1/707; H04B 1/713
(52) U.S. Cl. ............. 375/147; 340/426.19; 342/357.06; 342/357.07; 342/357.12
(58) Field of Search ........................ 375/147; 340/426, 340/426.1, 426.19; 342/357.06

(56) References Cited

U.S. PATENT DOCUMENTS 6,018,704 A    1/2000  Kohli et al. ................. 702/149
6,028,887 A  * 2/2000  Harrison et al. ............. 375/147
6,151,353 A  * 11/2000 Harrison et al. ............. 375/136
6,278,403 B1 * 8/2001  Peng et al. ............. 342/357.12
6,366,606 B1 * 4/2002  Sriram ....................... 375/150
6,480,150 B2 * 11/2002 Falk et al. ............. 342/357.12
2001/0048388 A1 * 12/2001 Falk et al. ............. 342/357.12

FOREIGN PATENT DOCUMENTS

WO          99/63360     12/1999     ........... G01S/11/02

* cited by examiner

Primary Examiner—Stephen Chin
Assistant Examiner—Harry Vartanian
(74) Attorney, Agent, or Firm—Sughrue Mion, PLLC

(57) ABSTRACT

A low power RF receiver (1) has an antenna (2), a reception and shaping stage (3) for the radio-frequency signals provided by the antenna, a 12-channel correlation stage (7) receiving intermediate signals (IF) shaped by the reception stage (3), and a microprocessor (12) connected to the correlation stage for calculating X, Y and Z position, velocity and time data as a function of data provided by the radio-frequency signals, such as GPS signals, transmitted by satellites. Each channel includes a correlator (8) associated with a controller (9), which also includes a digital signal processing algorithm to allow all the synchronisation tasks for acquiring and tracking a satellite to be performed autonomously when the channel (7') is set in operation, and to lock onto the satellite. Buffer registers (11) are placed at the interface between the correlation stage (7) and the microprocessor (12) for the mutual transfer of data. The low power RF receiver may be mounted in the case of a watch and powered by the energy accumulator or battery of the watch.

14 Claims, 5 Drawing Sheets

LOW POWER RF RECEIVER WITH REDISTRIBUTION OF SYNCHRONISATION TASKS

BACKGROUND OF THE INVENTION

The present invention concerns a low power RF receiver with redistribution of synchronisation tasks. The low power RF receiver includes in particular an antenna for receiving radio-frequency signals originating from satellites, a reception and shaping stage for the radio-frequency signals supplied by the antenna, a correlation stage formed of several channels which each include a correlator, said correlation stage receiving intermediate signals shaped by the reception stage, a microprocessor connected to the correlation stage and intended to calculate X, Y and Z position data, velocity and time data as a function of the data extracted, after correlation, from the radio-frequency signals transmitted by the satellites. In case of a GPS receiver, the data extracted from the GPS signals are, in particular, the GPS message and pseudo-ranges.

Currently, 24 satellites are placed in orbit at a distance close to 20,200 km above the surface of the Earth on 6 orbital planes each offset by 55° with respect to the equator. The time taken by a satellite to complete one entire rotation in orbit before returning to the same point above the Earth is approximately 12 hours. The distribution of the satellites in orbit allows a terrestrial GPS receiver to receive the GPS signals transmitted by at least four visible satellites to determine its position, its velocity and the local time for example.

For the transmission of the radio-frequency signals, each satellite includes an atomic clock set at a frequency of 10.23 MHz in order to supply precise time data to terrestrial GPS receivers. Terrestrial control stations allow certain satellite data to be corrected if necessary, for example as regards its time data and orbital data.

Each of these satellites transmits radio-frequency signals formed of a first carrier frequency L1 at 1.57542 Ghz on which are modulated the P-code at 10.23 MHz and the C/A PRN code at 1.023 MHz peculiar to each satellite with the GPS message at 50 Hz which contains the ephemerides and almanac data used in particular for calculating position, and a second carrier frequency L2 at 1.2276 Ghz on which are modulated the P-code at 10.23 MHz with the GPS message at 50 Hz. In civilian applications, only carrier frequency L1 with the C/A code is used by the terrestrial receivers for calculating the X, Y and Z position, velocity and time, in accordance with the GPS message.

The C/A PRN code (pseudo random noise) of each satellite, which is also called the Gold code, is a unique pseudo random code for each satellite so that the signals transmitted by the satellites can be differentiated within the receiver. All the Gold codes have the characteristic of being orthogonal, i.e. by correlating them with each other, the correlation result gives a value close to 0. This characteristic allows several radio-frequency signals originating from several satellites to be processed independently and simultaneously in several channels of the same GPS receiver.

This C/A code is a digital signal which is formed of 1023 chips and which is repeated every millisecond. This repetition period is also defined by the term epoch of the Gold code. It is to be noted that a chip takes values of 1 or 0 as for a bit. However, a chip (a term used in GPS technology) should be differentiated from a bit which is used to define a unit of information.

The Gold codes are defined for 32 satellite identification numbers which still leaves a free choice as to the specific code attributed to each other satellite which will be put in orbit on one of the orbital planes.

In the GPS receiver at the correlation stage, a C/A code generator generates a known replica of a C/A satellite code by a sequence of 1023 different chips for each phase adjustment for acquiring a satellite. The chip codes are offset in time in a shift register implementation by orienting the clock which controls said shift registers.

In several areas of activity, the use of GPS receivers which are portable or integrated in other devices of larger dimensions has enabled users to be provided with navigation data facilitating, in particular, the taking of bearings and knowledge of their location. One may cite in particular the use of GPS receivers incorporated in the instrument panel of road vehicles and in co-operation with cartographic data stored to allow a route to be indicated to a driver of said vehicle.

The reduction in size of GPS receivers has become a necessity to allow the incorporation thereof in objects which can easily be carried by a single person wishing to know his position and velocity at any location in a relatively precise manner. With the reduction in size of these receivers, which are powered by batteries, constructions guaranteeing a certain saving in the energy consumed by said receivers have had to be designed, hence the manufacturing of low power receivers.

Of course, the consumption requirements are dependent on the capacity of the supply battery to supply power to the GPS receiver when the received radio-frequency signals are processed. The smaller the battery, the more necessary it becomes to design smaller integrated circuit electronic units for the GPS receiver. Further the manner in which the signals are processed in said circuits to extract the GPS message and the pseudo-ranges from each satellite picked up have to be processed in an optimal manner.

Since mounting of GPS receivers in portable objects, such as cellular telephones or wristwatches, is envisaged, the integrated circuits must be designed so that their power consumption is not too large in order to avoid having to change the battery of the object too frequently or having to keep recharging an energy accumulator at frequent intervals.

In the case of an integration in a wristwatch, a reduction in size is imposed not only for the board carrying the integrated circuits for processing the received signals, but also for the antenna and the accumulator insofar as possible. A reduction in power consumption may be achieved by using a technology of reduced size for manufacturing the integrated circuits of the correlator and the calculation by micro-controller. CMOS technology of 0.5 $\mu$m may for example be used, or in the near future, with a CMOS technology of 0.18 $\mu$m while guaranteeing proper operation at a high frequency. Moreover, optimisation of the GPS signal processing algorithm of the microprocessor implemented in the correlator may further reduce the power consumption of the receiver.

Several embodiments of low power receivers have already been the subject of Patents for the purpose of saving, as far as possible, the energy consumed by the receiver during operation. U.S. Pat. No. 5,650,785 of the company Trimble Navigation Limited, may be cited, concerning a low power GPS receiver. This receiver includes, in particular, a RF section with frequency division and quantification of the GPS signals for the correlation stage, and a microcontroller device which controls a supply voltage modulator. This supply voltage modulator is used to deactivate the RF section for a period of time less than the time necessary to correlate the GPS signals in order to reduce as far as possible the power consumption of this heavy power consuming RF section while letting the correlation stage operate.

Given the significant data transfer which has to occur between the correlator and the microprocessor, in order to increase the signal processing speed while trying to save energy, the current tendency is to provide the receiver with a 32-bit microprocessor. However, improving the capacities of the receiver with such microprocessors has the drawback of a significant exchange of data between said microprocessor and the demodulator or correlator, this exchange moreover occurring at a frequency exceeding one kHz.

In order to fix an order of magnitude of the current energy consumption of low power GPS receivers, the GPS receiver called ACE III of Trimble Navigation Limited may be taken as an example. This receiver has an 8 channel architecture, this architecture being the quickest for the purpose of saving energy and guaranteeing better reliability. The dimension of the board with the components is 8.26 cm×4.65 cm ×1.15 cm. The power consumed is less than 0.5 W without taking account of the consumption of the antenna amplifier. This GPS receiver device is used for navigation, tracking (localisation), data collection or other applications in which the device is battery powered. This receiver includes 32 correlators.

A first integrated circuit is the RF/IF frequency converter intended to send the shaped data to the correlation stage, in which there is a passage to an intermediate frequency in order to reduce, amongst other things, the power consumption, without deteriorating the quality of the received signal. A second integrated circuit receiving the intermediate signals is the GPS DSP whose microprocessor is of the 32-bit type. The power consumed by this receiver is of the order of 0.5 W for a voltage not exceeding 3.5 V. Even with such a relatively low consumption, this receiver is hardly in a position to be able to be fitted for example to a watch or a portable telephone provided with a low power accumulator or a battery.

If a real time calculation is desired, this requires significant calculating power which can only be achieved by means of large microprocessors, in particular with 32-bit microprocessors.

SUMMARY OF THE INVENTION.

One object of the present invention consists in providing a low power RF receiver able to reduce power consumption as far as possible such that the accumulator or battery of said object does not run down too rapidly while differentiating from the GPS receiver devices of the prior art.

Another object of the present invention consists in being able to integrate all the components of the RF receiver inside the case of a watch in order to be powered by an energy accumulator or a battery.

These objects, in addition to others, are achieved by the low power RF receiver cited above which is characterised in that, in each channel, a controller, including a digital signal processing algorithm, is associated with the correlator to allow all the synchronisation tasks to be performed autonomously when the channel is set into operation for acquiring and tracking a satellite, and in that at least a set of data input and output registers is placed at the interface between the correlation stage and the microprocessor in order to receive data transmitted by the microprocessor to the correlation stage and data supplied from the correlation stage, said data passing through the set of registers being formed of signals of a frequency lower than or equal to the frequency of the message signals, so that the microprocessor can perform the tasks of calculating the position, velocity and time without any intervention as regards the synchronisation and correlation tasks.

These objects, in addition to others, are also achieved by a watch including such a RF receiver which is characterised in that the RF receiver is housed in the watch case and is powered by an energy accumulator or by a battery also used to power the electronic components of the horological functions.

One advantage of the RF receiver, in particular the GPS receiver, is that a significant part of the digital signal processing algorithm, called the DSP algorithm, is placed using a dedicated material in the correlation stage. This thus allows these software tasks, which were previously assigned to a 32-bit or more microprocessor in said correlation stage, to be redistributed. The microprocessor is thus only used to perform calculating tasks in accordance with the GPS messages of at least four satellites drawn from the received radio-frequency signals. The invention even proposes implementing the whole algorithm in a controller located in the correlation stage. Synchronisation is thus achieved in hard-wired logic to the exterior of the microprocessor used for the final calculation. A bit-parallel architecture is thus provided in each channel with a control for each correlation stage in the control loops.

Since there is no longer a very significant data transfer between the correlator and the microprocessor and this transfer no longer needs to occur very quickly, an 8-bit microprocessor alone can be used. The microprocessor is thus only used for low frequency calculations with digital signals between 50 Hz to 2 Hz for navigation, hence a saving of energy. Of course, the correlator stage has to include memory elements, an arithmetical unit, a correlator control unit and a data bit synchronisation unit to perform the actual different synchronisation and correlation steps.

Previously, the software tasks which until now were performed in the microprocessor in communication with the correlation stage occurred at a frequency of the order of one kHz. Thus each time a transfer of data had to occur at this frequency. Now, since the algorithm acting on the control loops of the correlator has been transferred in each of the 12 channels in the form of a hard-wired logic all the synchronisation calculations at frequencies greater than one kHz are performed in the correlation stage. There are now only transfer data at 50 Hz passing through the buffer registers at the interface between the correlation stage and the master microprocessor, which allows a significant amount of energy to be saved.

With this new redistribution of software tasks, the power consumption of the receiver is greatly reduced hence possible integration in a watch. By way of comparison, the RF receiver of the present invention is provided with power consumption of the order of 100 mV with a supply voltage lower than or equal to 3 V, and may be brought to a power of the order of 50 mV in the near future. The RF receiver with all its components placed on a printed circuit board has a space requirement close to 8 $cm^3$.

The clock frequencies used in the receiver are adapted as a function of the frequencies of the received radio-frequency signals in order to clock several parts at the same rate clock which also results in a reduction in the number of electronic elements in particular in the correlation stage and consequently the power consumption of the receiver. Moreover, a reduction in power consumption is achieved by making a frequency conversion, or compression of the radio-frequency signals heading for the correlation stage.

The microprocessor may be used when at least three or four satellites have been detected in order to reduce any unnecessary power consumption, given that each channel of the correlation stage can co-ordinate the search and tracking operations of the satellite detected in an autonomous manner.

BRIEF DESCRIPTION OF THE DRAWINGS

The objects, advantages and features of the low power RF receiver with redistribution of the software tasks in the the correlation stage will appear more clearly in the following description of embodiments illustrated by the drawings, in which.

DETAILED DESCRIPTION OF THE INVENTION

In the following description, the RF receiver is described such as a GPS receiver. Several elements of the GPS receiver which are well known to those skilled in the art in this technical field will only be mentioned in a simplified manner. The accent is especially placed on the redistribution of the software tasks, in particular the synchronisation tasks in the correlation stage. In the prior art, these tasks were executed in the microprocessor.

The low power GPS receiver is preferably intended to be fitted to a wristwatch in order to provide, as required, to the person wearing the watch, position, velocity and local time data. As the watch has an accumulator or battery of small size, the power consumed must be as low as possible when the GPS receiver operates. It is for these reasons that essentially the synchronisation tasks concerning the acquisition and tracking of satellites have been distributed at the correlation stage and are no longer in the microprocessor as will be explained in more detail in the following description.

Of course, the GPS receiver could be fitted to other portable objects of small size which are provided with an energy accumulator or a battery in the same way as the aforecited watch, for example a, portable telephone.

When the GPS receiver is mounted in a wristwatch case, account must also be taken of the dimensions of the antenna. It should be noted that a reduction in the antenna size, and the ground plane on which it is mounted, results in a reduction in the gain pattern, due to the losses in the signal noise ratio (SNR). Several efforts concentrated on improving the signal acquisition and the tracking algorithms which compensate for losses in the signal noise ratio for said receiver.

The data transfer with the microprocessor no longer occurs during all the correlation steps. It is only the result of the correlation of each channel of the correlation stage which is transferred to the microprocessor, in particular the GPS messages at a frequency of 50 Hz. Consequently, the high power consumption noted previously during the exchange of data or parameters between the microprocessor and the correlation stage during the acquisition and tracking phases which occurred at frequencies higher than one kHz have been greatly reduced.

Figure 1:
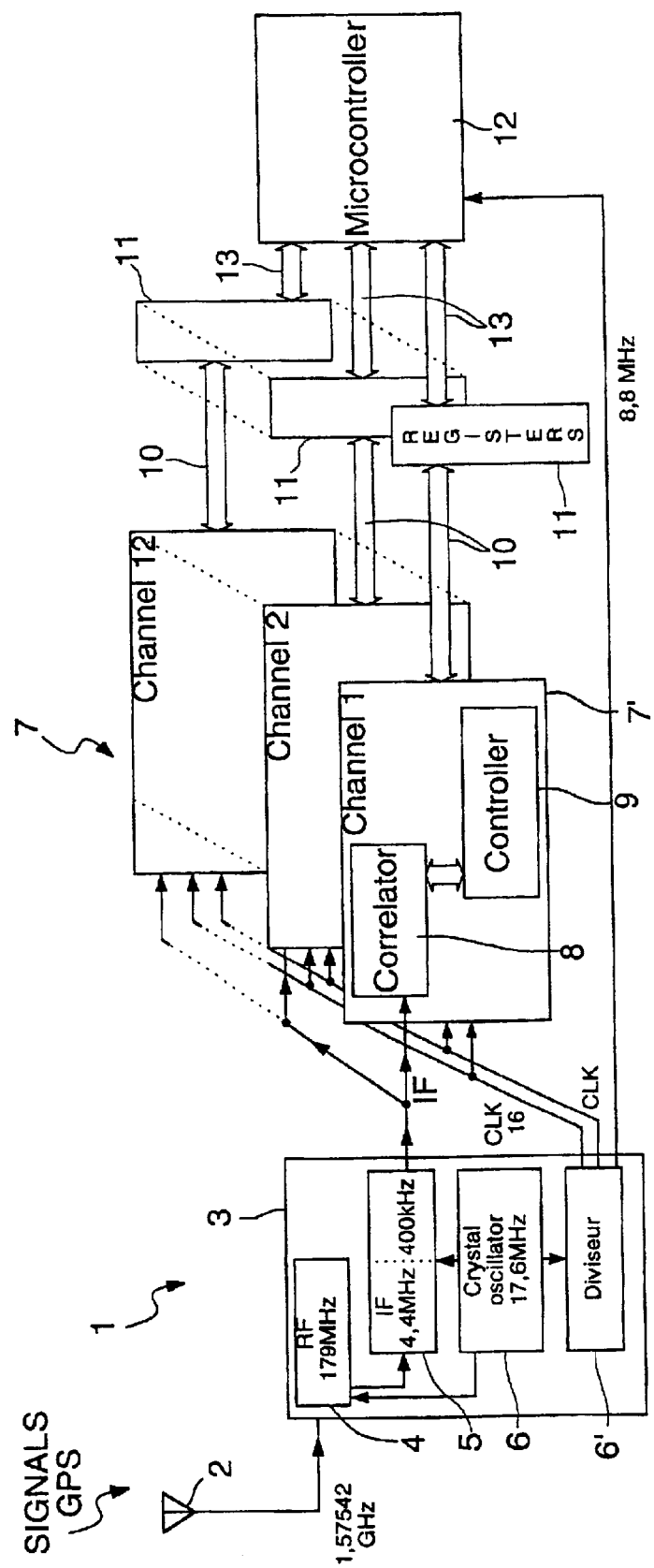
FIG. 1 shows schematically the set of elements forming the RF receiver according to the invention.

The low power GPS receiver 1 is shown schematically in FIG. 1. It is formed of an antenna 2 for receiving radio-frequency signals originating from several satellites, a receiving and shaping stage 3 for the radio-frequency signals provided by antenna 2, a correlation stage 7 receiving intermediate signals IF in a complex form at a frequency of the order of 400 kHz from shaping stage 3, said correlation stage being formed of 12 channels 7', a data transfer bus 10 connecting each channel to a respective buffer register 11, and finally a data bus 13 connecting each buffer register to a microprocessor 12.

Registers 11 of each channel are able to receive data or configuration parameters originating from the microprocessor or from a memory associated therewith for correlation channel 7', and is able to transmit data concerning the GPS messages, the state of the PRN code, the frequency increment relating to the Doppler effect, the pseudo-ranges and other data after correlation and locking onto a specific satellite.

Buffer registers 11 are formed of several sorts of registers which are for example command and status registers, registers for NCO oscillators (Numerically Controlled Oscillators) of the channels, pseudo-range registers, energy registers, offset registers and increment registers of the carrier and of the code, and test registers. It is to be noted that these registers may accumulate data during the correlation phase in order to be used during the satellite acquisition and tracking procedures without necessarily being automatically transferred to the microprocessor.

In an alternative embodiment, a single unit of registers 11 can be envisaged for all the channels 7' of the correlation stage, given that certain data placed in the register unit are common to each channel.

In reception stage 3, a first electronic circuit 4 converts the radio-frequency signal from frequency 1.57542 GHz to a frequency of 179 MHz, and a second electronic IF circuit 5 proceeds to a double conversion to bring the GPS signals first to a frequency of 4.8 MHz then finally to a frequency of 400 kHz by sampling at 4.4 MHz in order to be able to supply an intermediate complex IF signal which is sampled and quantified at the correlation stage. This intermediate complex IF signal is thus formed of a in-phase signal I and a quarter-phase signal Q.

The signals supplied by the second circuit 5 give in half these cases signals of different parity (+1 and −1). This parity must then be taken into account for the GPS signal demodulating operations in the receiver.

In the case of a low power GPS receiver, it is recommended to produce intermediate IF signals with 1-bit of quantification for the carrier frequency, even if this quantification generates an additional loss of the order of 3 dB on the signal noise ratio (SNR).

For these frequency conversion operations, a quartz oscillator 6 calibrated at a frequency of the order of 17.6 MHz forms part of the radio-frequency signal reception and shaping stage 3. The frequency of this oscillator is increased to approximately 1.4 GHz to perform a multiplication with the GPS signals at 1.57542 GHz in order to supply converted signals at a frequency of 179 MHz in the first RF circuit 4. The oscillator clock signal is applied to the second IF circuit to be able to convert the GPS signals first to a frequency of 4.8 MHz and then to the frequency of 400 kHz. A clock frequency division then occurs in this second circuit 5 in order to provide a GPS signal sampling frequency of the order of 4.4 MHz which is normally equivalent to the clock frequency CLK intended for the correlation stage. However, it should be noted that the Applicant has made the GPS receiver with a clock frequency CLK of 4.36 MHz which is also divided by 16 in the reception stage for example to give a frequency CLK16 of 272.5 kHz used for certain parts of the correlation stage, but by approximation in this description the frequency CLK is defined as equal to 4.4 MHz.

It should be noted that the frequency of 4.36 MHz could be much smaller, since two criteria define this value. The first criterion relates to the complex sampling algorithm where the bandwidth of the anti-overlapping filter limits the clock frequency to a minimum of 3 MHz. The second criterion is the clock frequency which has to be asynchronous with those of the PRN code (1.023 MHz), and the carrier (400 kHz). As a function of certain criteria of the RF/IF stage, said clock frequency has been set at 4.36 MHz.

In the present invention, microprocessor 12 is preferably an 8-bit microprocessor CoolRISC-816 by EM Microelectronic-Marin SA Switzerland. This microprocessor is clocked by a clock signal at 4.4 MHz derived from the signal of 8.8 MHz supplied by the divider 6' of reception and shaping stage 3.

A single semiconductor substrate may contain both the entire correlation stage with the registers and the microprocessor.

Given that the data transmitted by the buses 10 to registers 11 are signals at a frequency of 50 Hz, the processing of this data, in particular the demodulated GPS signals, may be achieved by a microprocessor of small size, since said microprocessor 12 is mainly used only for calculating the position X, Y and Z, the velocity and time. It should be noted that these calculations do not need to be effected in real time, this is why it is possible to use an 8-bit microprocessor while saving on the receiver's energy consumption since the synchronisation tasks for acquiring and tracking satellites at higher frequencies than one kHz are effected autonomously by a dedicated material in at least four channels 7' of correlation stage 7.

Each channel 7' of correlation stage 7 includes a correlator 8 and a controller 9 intended to set into operation via a dedicated material in particular the signal processing algorithm for acquiring the satellite signal and tracking the satellite detected by the channel.

Controller 9 of each channel includes, amongst other things, a memory unit, an arithmetical unit, a data bit synchronisation unit, a correlator control unit and an interruption unit which are not visible in FIG. 1. The memory unit is formed, in particular, of a RAM memory for storing momentary data. The RAM memory is distributed in a non-regular or regular structure. The arithmetical unit performs addition, subtraction, multiplication, accumulation and shift operations.

All the acquisition and tracking tasks of the detected satellites are thus performed autonomously in each respective channel of the correlation stage in a bit-parallel architecture where the calculation of several bits is made in one clock pulse. When a channel has locked onto a satellite, the circuit synchronises the flow of GPS data intended for subsequent calculations.

As described previously, several radio-frequency signals originating from several satellites are received by the antenna. Since their C/A codes are orthogonal, the channels can work simultaneously to each lock onto a respective satellite.

It should be noted that the position of the satellites in the sky is known, which means that one may envisage keeping all the information concerning said satellites, their Gold code, and those which are able to be seen by the terrestrial GPS receiver at the moment that it is set in operation, in a memory of the receiver.

The intermediate IF signals supplied to the correlation stage include noise which is 15 dB higher than the useful signals, which is why it is necessary to know the shape of the signals that the receiver has to demodulate. This is used to ensure correlation of the IF signals and demodulation of the GPS message for the microprocessor once the channels have each locked onto a respective visible satellite.

In the GPS application, the DSP algorithms are executed at different frequency rates. The algorithms which are executed at lower frequency rates, up to one kHz, essentially consist of the following functions: controlling the pre-detection bandwidth, acquiring the signal, tracking the signal, detecting blockage, synchronising the bits, demodulating data, checking parity and calculating measurement. The tasks which are executed at a higher frequency rate, i.e. higher than one kHz, are the pre-correlation amplification control, pre-correlation signal filtering, sampling and quantifying, removing Doppler effect, generating the carrier frequency by the NCO, the PRN code generation and the correlation steps.

Figure 3:
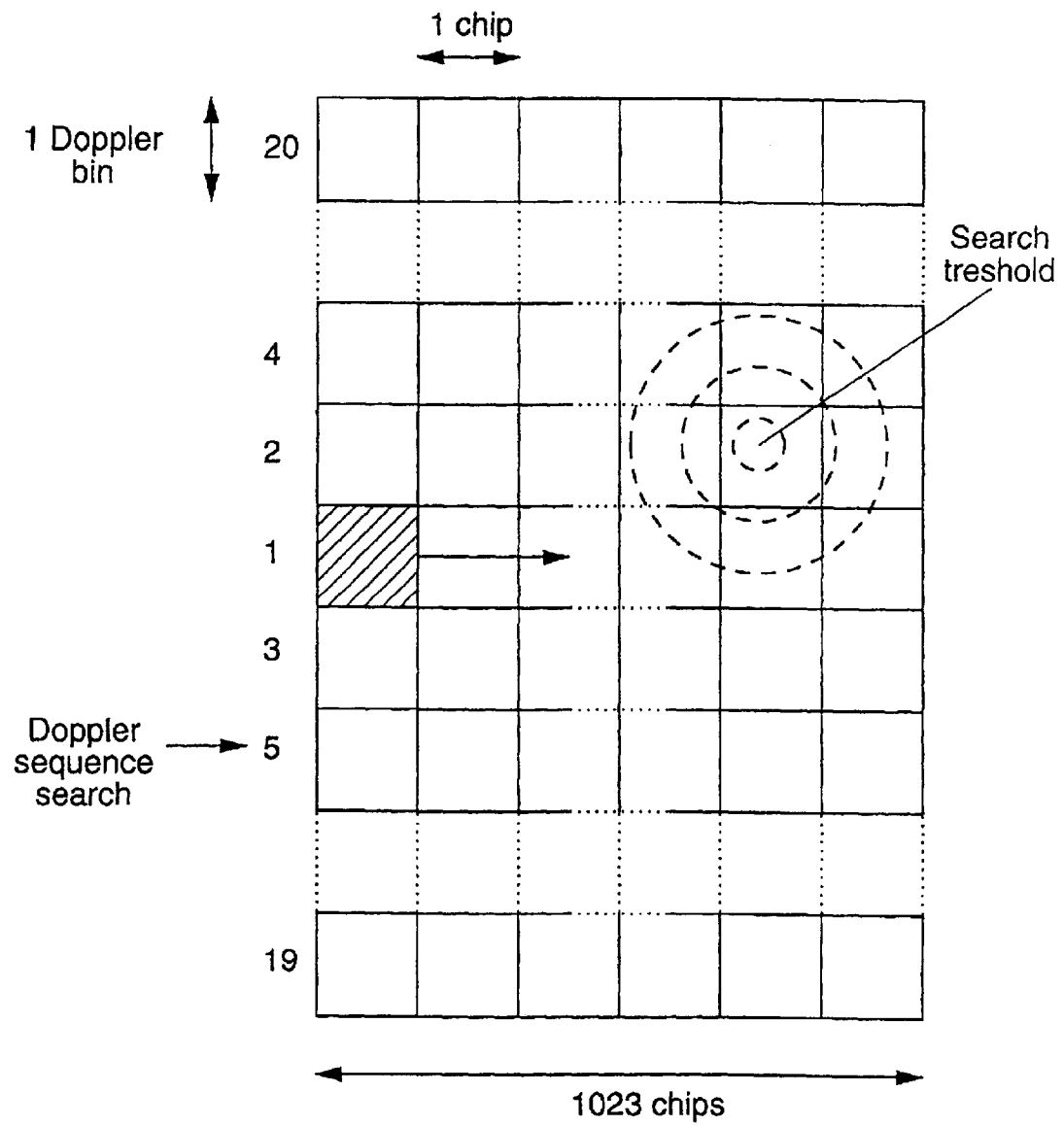
FIG. 3 shows a diagram of the adaptation increments of the carrier frequency and the C/A code of the channels in two dimensions for the acquisition and tracking of visible satellites.

In a first satellite search phase, the frequency parameters are established and the PRN code is loaded so that the channel can begin the search. It examines all the possible phases in a single carrier frequency with a resolution of one chip, as shown in FIG. 3. When the satellite has been found, the circuit locks onto the signal while the internally generated carrier and code frequencies are adapted. As long as the signal power is sufficient, the channel continues synchronising the bits and takes out the GPS messages.

To determine the pseudo-range, the state of the PRN code generator is transferred simultaneously for each channel, and for the current phase of the NCO code. This allows the information as to the distance which separates the receiver from the satellite with a resolution lower than a microsecond to be recuperated.

An additional reduction in consumption can be achieved in addition to the reduction in power consumption noted with the distribution of the software tasks in the correlation stage by deliberately interrupting the power supply to the RF part of the signal reception and shaping stage 3 for a period of time while keeping the code replica generation process active.

At the output towards the microprocessor from the buffer register stage 11, the one single bit GPS message is at a frequency of 50 Hz which allows a lot of energy to be saved. From the point of view of the gain obtained with this redistribution of the synchronisation tasks, the transfer of data between each correlation channel and the microprocessor is up to 3 orders of magnitude lower with respect to the GPS receivers of the prior art, since it is no longer necessary to transfer the energy and numerically controlled oscillator NCO increments for each epoch.

The state of the PRN code generator and the state of the NCO phase, in particular at the end of correlation, are placed in buffer register 11 to be able to determine the pseudo-range so that the microprocessor can extract therefrom with at least four satellites, the position, velocity and time.

In the configuration which has just been described with reference to FIG. 1, it should be noted that correlator 8 and controller 9 are clocked by a first clock signal CLK (4.36 MHz) and by a second clock signal CLK16 (272.5 kHz) for the most of the correlation stage. The control loops for adjusting the frequency parameters of the carrier and phase of the C/A code operate with digital signals of 1 kHz. This part of correlation stage 7 at 1 kHz is achieved in a bit-parallel architecture which allows autonomous processing of said signals of the loop by the controller at a lower frequency rate. At the end of the correlation chain the GPS signals received at a frequency of 1.57542 Ghz have been reduced by steps in order to be brought to signals of a frequency of 50 Hz corresponding to the GPS message which can be directly exploited by the microprocessor.

Figure 2:
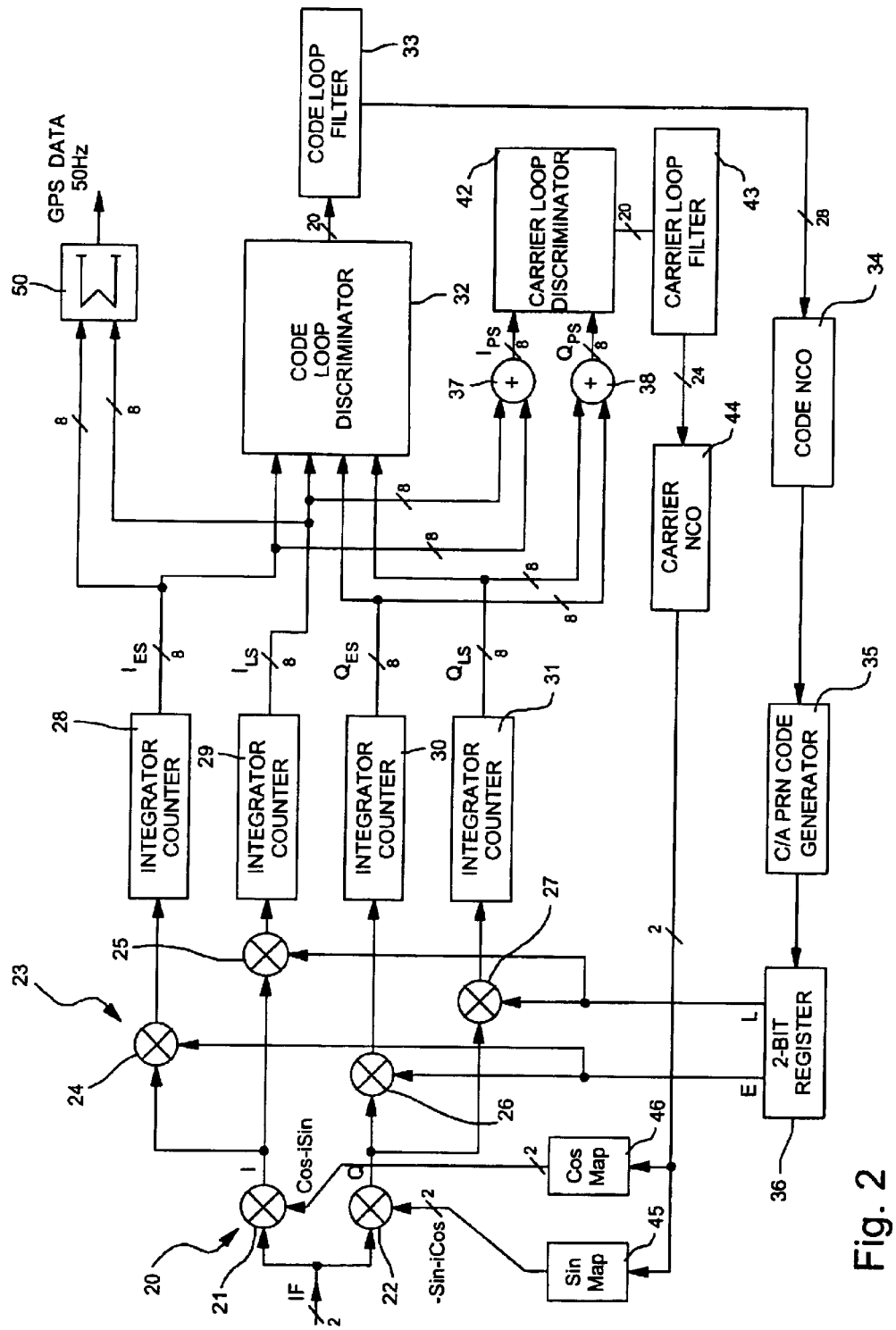
FIG. 2 shows the correlator of a channel for adapting the replica of the C/A code and the replica of the carrier frequency of the RF receiver according to the invention.

FIG. 2 shows correlator 8 with one portion for the PRN code control loop and another portion for the carrier frequency control loop. For more details relating to the various elements of this correlator, the reader will refer to the teaching drawn from chapter 5 of the book "Understanding GPS Principles and Applications" by Philip Ward and the editor Elliott D. Kaplan (Artech House Publishers, USA 1996) at the edition number ISBN 0-89006-793-7, and in particular to FIGS. 5.8 and 5.13 which show in broad outline all the elements of FIG. 2 of the present invention.

In the present invention, the punctual component has been removed from the code control loop for the purpose of energy saving, but a loss of signal noise ratio of the order of 2.5 dB is noted.

With reference to FIG. 2, the intermediate signal IF, represented in the Figure by a bold line intersected by an oblique line defining 2 bits, is a complex signal (I+iQ) formed of a 1 bit in-phase signal I and a 1 bit quarter-phase signal Q. Said intermediate signal IF has been sampled and quantified, and is passed first through a carrier multiplier stage 20. A multiplier 21 multiplies the signal IF by the cosine minus i times the sine of the replica of the internally generated carrier in order to extract the in-phase signal I from the complex signal, while a multiplier 22 multiplies the signal IF by the minus sine minus i times the cosine of the replica of the internally generated carrier in order to extract the quarter-phase signal Q from the complex signal.

After this operation the equivalent of the signal C/A code of a satellite to be acquired in a switched on channel with a C/A code generated in said channel corresponding to the desired satellite has to be found. To do this, the in-phase and quarter-phase signals pass through a second multiplier stage 23 to correlate the signals I and Q with an early replica and a late replica with respect to the C/A code to obtain four correlation signals. In each channel of the correlation stage, only the early replica and the late replica have been kept without taking into account the punctual replica. This allows the number of correlation elements to be minimised.

Multiplier 24 receives signal I and the early replica signal E from a 2 bit register 36 and supplies a correlated early in-phase signal. Multiplier 25 receives signal I and late replica signal L from register 36 and supplies a correlated late in-phase signal. Multiplier 26 receives quarter-phase signal Q and early signal E, and supplies a correlated early quarter-phase signal. Finally, multiplier 27 receives signal Q and late replica signal L, and supplies a correlated late quarter-phase signal. The drift between early replica E and late replica L is ½ chip in the embodiment of the present invention, which means that the drift between central punctual component P is ¼ chip. The multipliers can be made for simplicity using XOR logic gates for example.

The early and late signals which are spaced by ½ chip, are used in order to pick up the point of energy detected during acquisition of a satellite, which makes the use of punctual signals superfluous, with the aim of avoiding any unnecessary power consumption in the low power GPS receiver. Nonetheless, the use of these early and late components is sufficient for the acquisition of a satellite.

The four correlated signals each enter one of the integrator counters 28, 29, 30, 31, which are pre-detection elements, whose output values $I_{ES}$, $I_{LS}$, $Q_{ES}$ and $Q_{LS}$ are represented over 10 bits which means that a complete cycle of the C/A code was required to find said values. A complete set of values $I_{ES}$, $I_{LS}$, $Q_{ES}$ and $Q_{LS}$ is obtained each millisecond or each epoch. All the operations in the loops which follow these integrators occur in a bit-parallel architecture with signals at a frequency of 1 kHz. In order to eliminate part of the noise of the useful signal to be demodulated, only the 8 most significant bits are used for the rest of the digital signal processing chain.

The values of signals $I_{ES}$, $I_{LS}$, $Q_{ES}$ and $Q_{LS}$ represented in the Figure by a bold line intersected by an oblique line defining 8 bits, are passed into a code loop discriminator 32 and into a code loop filter 33. The code loop discriminator performs the operations of calculating the energy of signals $I_{ES}$, $I_{LS}$, $Q_{ES}$ and $Q_{LS}$. The discriminator is non-coherent of the delay lock loop (DLL) type. It is formed in particular by an 8-bit multiplier and by a 20-bit accumulator. On this discriminator, a correction is made to the carrier loop, since when the signal is transmitted by the satellite the Doppler effect is felt not only on the carrier frequency, but also on the C/A code which is modulated on the carrier frequency. The addition of the carrier in the code loop discriminator corresponds to a division of the offset increment of the carrier by 1540.

Depending on the filtered result of the discriminator, a phase increment is imposed by the 28-bit NCO on the PRN code generator 35 so that it transmits the series of bits from the C/A PRN code to register 36 to make a new correlation. The frequency resolution of this 28-bit NCO is of the order of 16 mHz (for a clock frequency of 4.4 MHz).

The various results of the loop are processed by the controller in order for it to co-ordinate the acquisition and tracking operations. Once there is synchronisation and locking onto the desired satellite, the values $I_{ES}$ and $I_{LS}$ are introduced into a demodulation element 50 able to provide the data message at 50 Hz on 1 bit via the data input and output register to the microprocessor. In addition to the message, the microprocessor can take information concerning the pseudo-ranges introduced into the buffer register in order to calculate the X, Y and Z position, the velocity and precise local time.

In the control loop, a modified multiple dwell detector which is not shown has been implanted in each channel in order to guarantee a good reduction in synchronisation time to reduce the power consumption of the receiver. The predetection time of the integrators remains however constant at 1 ms. In this detector, at the end of the first detection, an energy threshold is subtracted at the output of the energy detector. If the result of this subtraction is smaller than 0, this means that there is a shortage of energy. In the contrary case, a second detection can begin. The energy threshold is again subtracted from the new output of the energy detector which is added to the result of the previous operation. These operations are repeated N times until the signal is declared present. From this instant the tracking process can start. This detector thus allows the acquisition of the satellite signal to be accelerated.

All the elements explained hereinbefore will not be described in more detail, given that they form part of the general knowledge of those skilled in the art in this technical field.

With reference to FIG. 2, the IF signal is multiplied by the cosine minus i times the sine of the replica of the internally generated carrier in multiplier 21 and by the minus sine minus i times the cosine of the replica of the internally generated carrier in multiplier 22. These signals (Cos—iSin) and (-Sin—iCos) originate respectively from a unit 45 and a unit 46 of a table of the replica signal. The purpose is to extract actually the carrier frequency from the signals carrying the GPS message.

The sum of the signals $I_{ES}$ and $I_{LS}$ in adder 37 is used to create the signal $I_{PS}$ and the sum of signals $Q_{ES}$ and $Q_{LS}$ in adder 38 is used to create the signal $Q_{PS}$, both shown with 10 bits. These values are introduced at a frequency of 1 kHz into a carrier loop discriminator 42 (envelope detection) to calculate the energy of the signals followed by a carrier loop filter 43. The discriminator is formed in particular of an 8-bit multiplier and a 20-bit accumulator. It is of the frequency and phase lock loop type.

A mean operation is performed on the frequency discriminator in order to increase the robustness and precision of the carrier tracking loops. The accumulation provided in the discriminator lasts 16 cycles, which corresponds to 16 ms.

According to the output of the discriminator and after passage through the filter, the 24-bit NCO of carrier 44 receives a frequency increment (bin) for the correction of the carrier frequency replica. This 24-bit NCO has a frequency resolution of the order of 260 mHz.

The two control or enslaving methods of the code and the carrier are synchronised during tracking, although the carrier tracking loops are only updated after confirmation of the presence of the satellite signal.

It should also be noted with reference to FIG. 2 that the numerically controlled oscillator defined by NCO should be sufficiently wide to have a small frequency resolution, but the phase accumulation in these wide NCOs consumes a lot of energy which is contrary to the manufacture of a low power GPS receiver. Several NCO arrangements may be provided in order to reduce their power consumption as much as possible, since it constitutes a significant part of the power consumption of the receiver with the integrators.

FIG. 3 shows a diagram of the method for establishing a replica of the 2 dimensional signal showing the phase and frequency increments in the control loops for the code and the carrier. This allows on the one hand the C/A code phase, and on the other hand the modified carrier frequency by the Doppler effect to remove the residue of this frequency by correlation at the input of the correlation stage to be retrieved.

It should be noted that during the transmission of radio-frequency signals by a satellite, the Doppler effect has an influence on said signals both on the carrier frequency and on the C/A code, which means that the code and carrier control loops are connected to each other to obtain better adjustment precision of the PRN code phase and the carrier frequency received at the receiver.

The acquisition and tracking algorithms require the replica from the carrier frequency of the satellite for demodulation. The removal of the Doppler effect which may cause frequency errors of between ±4.5 kHz inherent in all transmission of radio-frequency signals from moving satellites may be eliminated by adapting either the phase or the frequency of the incoming signal in the receiver.

Other errors due to the imprecision of the internal oscillator or to the effects of the ionosphere are added to errors due solely to the Doppler effect. As a general rule, one can count on a frequency offset of between ±7.5 kHz. These errors may of course be corrected in the code loop and the carrier loop during the acquisition and tracking phase.

At each correlation epoch, the PRN code phase is delayed by steps of 1 chip. This allows the code to be offset in time in order to find the satellite phase offset. Once the satellite has been found, the carrier frequency including the Doppler effect has to be corrected which occurs in a carrier control loop. Since the difference between the received carrier frequency and the generated carrier frequency is limited to more or less 250 Hz, several searches at different frequencies of the carrier may be necessary. In the worst case, up to 20 searches are necessary to correct the frequency in the carrier NCO.

A relation between the code and carrier control loops is established, since during transmission of the radio-frequency signals the Doppler effect acts both on the carrier frequency and on the C/A code, as explained hereinbefore.

Figure 4:
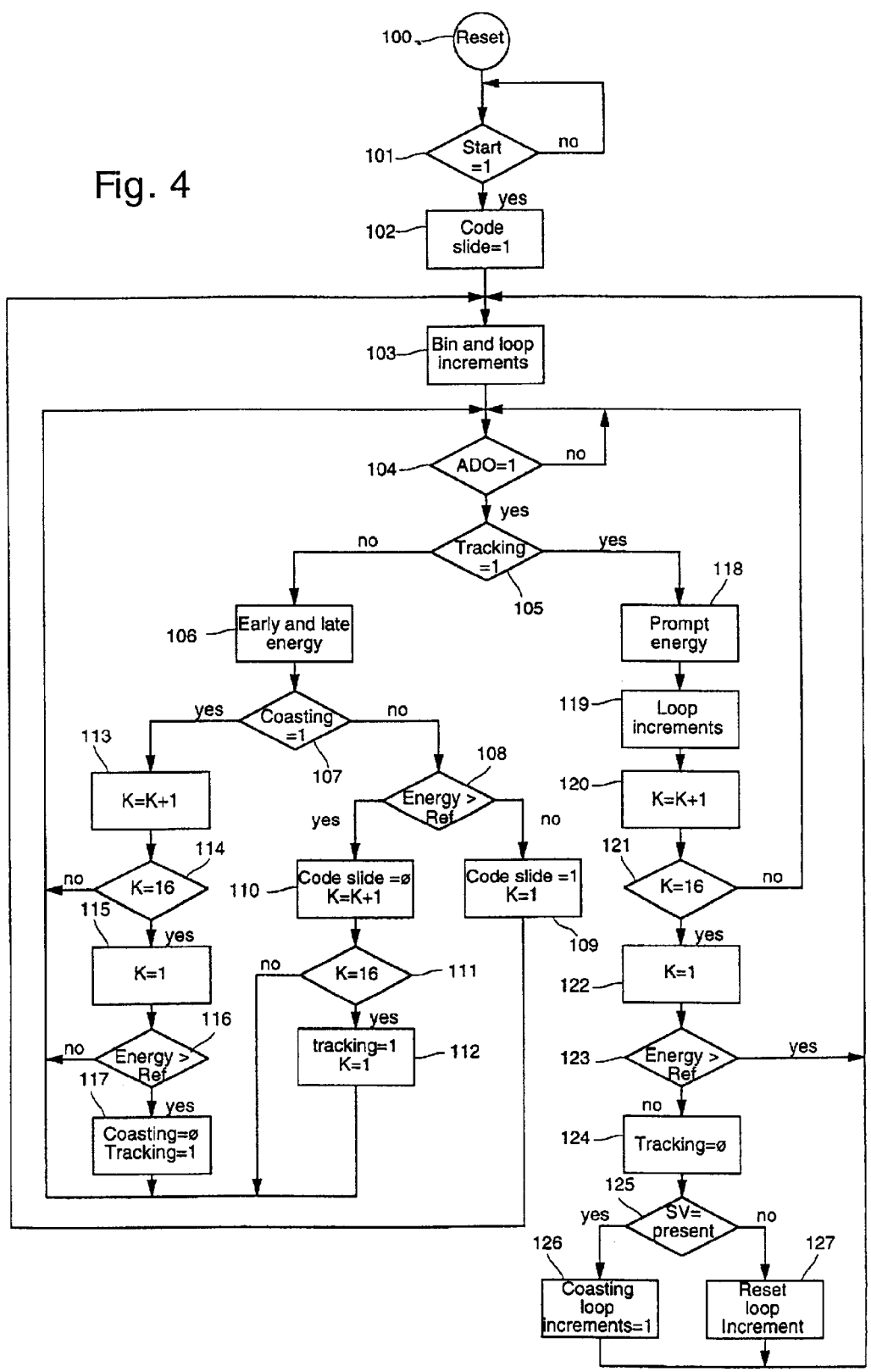
FIG. 4 shows a flow chart of the satellite search and tracking operations of the RF receiver according to the invention.

FIG. 4 shows a flow chart of the acquisition and tracking algorithms of the satellite signal in the correlation stage. These algorithms constitute the most important characteristics of the GPS receiver. These algorithms are implanted in the controller in a hard-wired logic structure where the correlator control unit generates a sequence of control signals to the correlator when data transfers have to appear in the memory unit and the arithmetical unit. Information is extracted from the memory unit which is responsible for the operations of the arithmetical unit and also stores the calculation results or values of the chain of loops in the acquisition and tracking modes. The buffer registers store established values during the enslaving of the various portions of the channel.

Initialisation parameters are placed in the buffer register so that they can be read by the controller of the channel which is selected to launch the acquisition and tracking phases. Different parameters or information from the correlator or controller are also placed in this register so that they can be read by the microprocessor, The state of the values or the parameters of the signals accumulated in the control loops are processed by the controller which is mainly clocked by a clock frequency CLK16 (272.5 kHz).

After 1 ms, i.e. 1 epoch, the integrator counters supply the values $I_{ES}$, $I_{LS}$, $Q_{ES}$ and $Q_{LS}$ as well as the values $I_{PS}$ and $Q_{PS}$ which are 10-bit values which corresponds to an accumulation for 1 ms, given that the C/A code is formed of 1023 bits over a period of 1 ms.

With reference to FIG. 4, after having set to zero at step 100 all the data previously stored in the controller or in the correlator or in the buffer register, a start instruction 101 is given. Suppression of the increments of loops 102 is performed and an instruction for loading the number of the PRN code and establishing frequency parameters is made. The channel may begin by the acquisition of the signal of the satellite to be sought. The frequency or phase increments 103 are written in the corresponding NCO.

Then, the algorithm enters in a rest mode waiting from an interruption in the pre-detection integrator counter. The interruption corresponds to the supply in the period of 1 ms of a first accumulated series of values $I_{ES}$, $I_{LS}$, $Q_{ES}$ and $Q_{LS}$ (ADO) of the signals correlated in the code control loop which are provided by integrator counter 104. Until the integrator counter has finished counting, i.e. as long as ADO is not equal to 1, it continues its integration.

Following this first series of values, as described with reference to FIG. 3, the acquisition of the satellite must first be achieved. Until one is in tracking mode 105, i.e. as long as the tracking instruction is not equal to 1, one enters the acquisition loop searching the C/A code phase. An energy calculation 106 of the four in-phase and quarter-phase values $I_{ES}$, $I_{LS}$, $Q_{ES}$ and $Q_{LS}$ according to the late and early correlated signals is effected (energy detector). This calculation is achieved by steps using the controller clocked by clock signal CLK16 according to the state machine of the acquisition and tracking operations.

Since it is possible for the radio-frequency signals to be interrupted due to an obstacle, a an interruption check 107 is performed. If the interruption instruction is at 0 in a normal operating case, a comparison of the energy level 108 to a threshold value is made. If the energy is not sufficient, there is a phase lag of the C/A code 109 and the number K of cycles is reset to 1 to be able to make a new correlation of the generated C/A code corrected with the intermediate signal in order to find the equivalent of the C/A code transported by the intermediate signal.

The loop previously described is repeated at level 103 until the energy of values $I_{ES}$, $I_{LS}$, $Q_{ES}$ and $Q_{LS}$ is greater than the reference energy threshold 108. In the affirmative case, the satellite has been found or acquired and there is no phase lag of code 110. Conversely, in order to be sure that the satellite has been found and not simply an error due to the noise in the control loop, the correlation and integration cycle of values $I_{ES}$, $I_{LS}$, $Q_{ES}$ and $Q_{LS}$ has to be repeated 16 times. If the number of cycles K at step 111 is different from 16, the loop has to be repeated through steps 104, 105, 106, 107, 108, 110 and 111. As soon as 16 cycles of 1 ms have occurred and it has been observed that the satellite has been acquired after an average value of the 16 stored values, the end of acquisition confirmation has been accomplished.

At the end of acquisition, tracking instruction 112 is set at 1 and the counter of the number of cycles reset to 1.

During step 107, if an interruption of the RF stage is imposed, i.e. if the interruption instruction is equal to 1, an increment of the number of cycles is performed at step 113. A check of the number of cycles occurs at step 114. As long as the number of cycles is not equal to 16, steps 104, 105, 106, 107, 113 are repeated. As soon as the number of cycles is equal to 16, the counter of number of cycles 115 is set to 1 and the energy calculated from values $I_{ES}$, $I_{LS}$, $Q_{ES}$ and $Q_{LS}$, at step 116 is compared to an energy threshold. If this energy is below the reference threshold, steps 104, 105, 106, 107, 113, 114 and 115 are repeated until the energy is higher than the reference threshold. At step 117, the interruption instruction is set to 0 and the tracking instruction is set to 1.

When the presence of the satellite has been confirmed, the tracking process can begin.

Following step 112 or 117 and after having passed through step 104, since the tracking instruction 105 is equal to 1, the tracking loop can be achieved. In this case, a calculation of punctual energy 118 of the in-phase and quarter-phase values $I_{PS}$ and $Q_{PS}$ at the output of the integrator occurs in the carrier loop discriminator (envelope detector). This calculation is performed by steps using the controller according to the state machine of the acquisition and tracking operations.

A determination of the frequency increments of loop 119 is performed followed by an increment of a cycle of the counter of the number of cycles K at step 120. At step 121, if the number of cycles K of 1 ms is not equal to 16, as previously defined in the code control loop, a repetition occurs of step 104 to step 121 until the number of cycles K at step 122 is equal to 16. After this instant, the counter of the number of cycles K is reset to 1, and a comparison of the energy calculated for the values $I_{PS}$ and $Q_{PS}$ with a reference energy threshold 123 is made. As long as the energy is greater than the reference threshold, the steps from 103 to 123 are repeated with each time an adjustment in the carrier and code frequency for the purpose of providing the replica of the carrier frequency of the intermediate signal to cancel it out by multiplication as explained with reference to FIG. 2.

The values $I_{PS}$ and $Q_{PS}$ must be below a reference energy threshold in order to be able to instruct the controller that the carrier frequency with in particular the Doppler effects has been found. If the energy at step 123 is less than the energy threshold, tracking instruction 124 is set to 0. From this instant, the data of the GPS message can no longer be demodulated because the level of energy is insufficient.

In step 125, a test is made to find out whether the satellite had been detected previously. In the affirmative case, increments are established in the coasting loop in order to try to find the lost satellite. Conversely, if the satellite had not yet been detected, the increments of loops 127 are reset and the system continues to search for a satellite. From step 126 and step 127, a return to step 103 occurs.

All the operations of the finite state machine (FSM) performed by the channel in acquisition and tracking phase are achieved autonomously by the co-operation of the controller and the correlator with the control loops in a bit-parallel architecture. The state machine includes 32 calculating and value storage positions to accomplish all the procedures during acquisition and tracking of a satellite.

Figure 5:
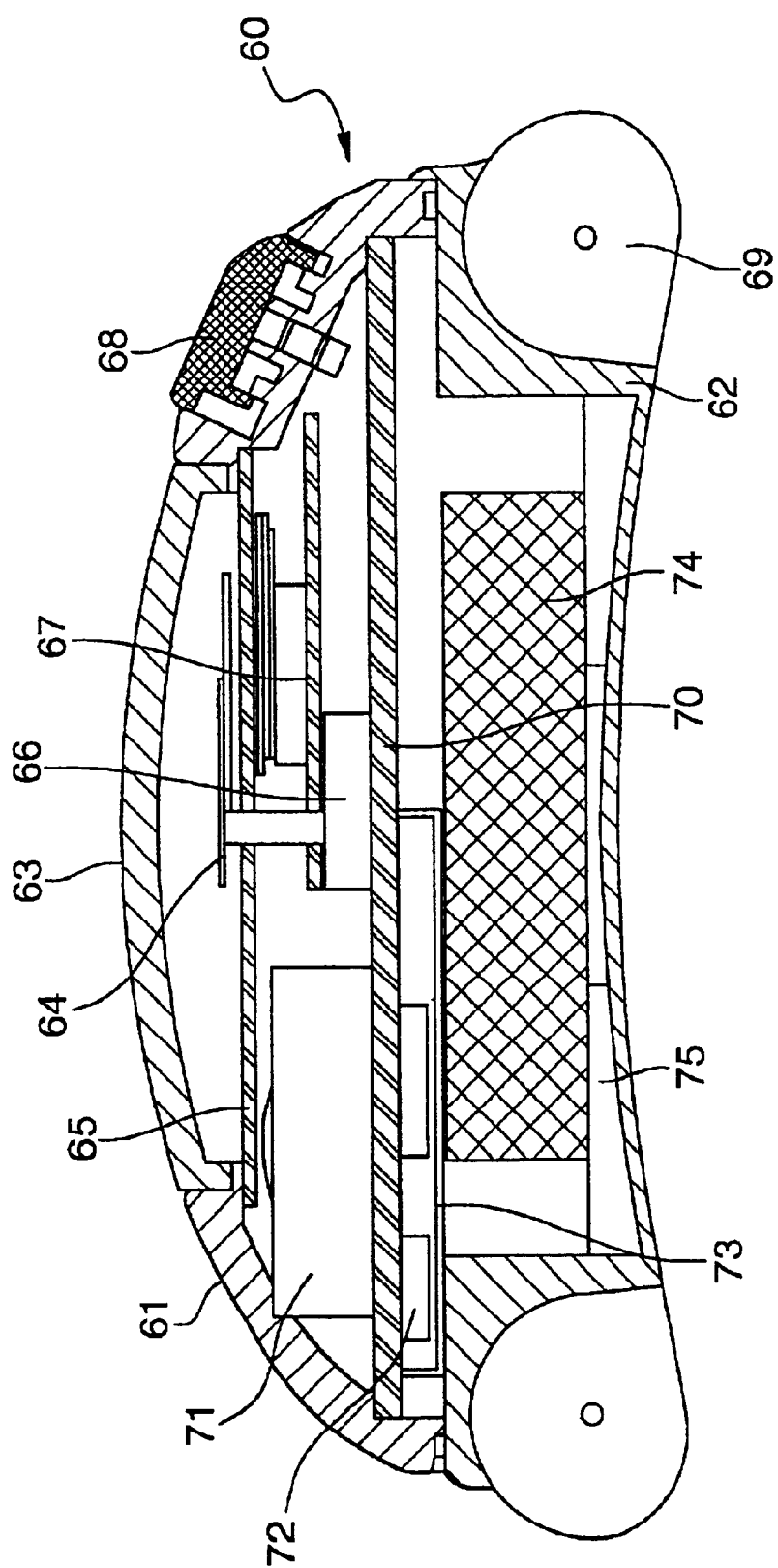
FIG. 5 shows a wristwatch fitted with a RF receiver according to the invention.

With reference to FIG. 5, the low power GPS receiver can be fitted to a wristwatch 60 of any type. Said wristwatch 60, which is in the present case a watch with an analogue time display and a digital data display, includes a case formed of a middle part 62 and a bezel 61 on which is placed a crystal 63, a dial 65, hands 64 for indicating the time or a direction, a micro stepping motor 66 for driving the hands forward, a PCB LCD module 67, at least one push-button 68 and means of attachment 69 to a wristband.

A GPS receiver is mounted in the watch case. This OPS receiver is formed of an antenna for example a micro-strip antenna 71 for receiving satellite radio-frequency signals mounted on a printed circuit board 70 on which are placed on the opposite side components 72 of said receiver. The components 72 are protected by a shielding 73 and are powered by a Li—ion accumulator 74 positioned under printed circuit board 70 in middle part 62. A charge coil of accumulator 75 is placed on the bottom of the middle part to be able to be magnetically coupled to an external device, not visible in FIG. 5, allowing the accumulator to be charged.

Of course other embodiments of the low power GPS receiver within the grasp of those skilled in the art could have been described without departing from the scope of the invention defined by the claims. A larger number of channels may be envisaged as long as they are each formed of a correlator and a controller having the possibility of performing in an autonomous manner the synchronisation of the channel by a suitable digital signal processing algorithm. This channel is designed in a dedicated material for acquiring and tracking a specific satellite.

The intermediate signals were described as complex signals including 1-bit in-phase and 1-bit quarter-phase signals, but providing such intermediate signals with several bits may also be envisaged.

The elements which form the correlation stage may undergo multiple modifications to reduce the power consumption of the receiver while keeping the implantation of the digital signal processing algorithm in the form of a hard-wired logic in each channel.

What is claimed is:

1. A low power radio-frequency receiver including an antenna for receiving radio-frequency signals originating from satellites, a reception and shaping stage for the radio-frequency signals provided by the antenna, a correlation stage formed of several channels which each include a correlator, said correlation stage receiving intermediate signals shaped by the reception stage, a microprocessor connected to the correlation stage and adapted to calculate X, Y and Z position, velocity and time data as a function of data extracted, after correlation, from the radio-frequency signals transmitted by the satellites, wherein the intermediate signals provided to the correlation stage are complex signals which have been sampled and quantified in the reception and shaping stage, these complex signals being formed for a 1-bit or more in-phase component and a 1-bit or more quarter-phase signal component, wherein, in each channel, a controller, including a digital signal processing algorithm, is associated with the correlator to allow all synchronisation tasks to be performed autonomously for acquiring and tracking a satellite when the channel is set in operation, and wherein at least a set of data input and output registers is placed at the interface between the correlation stage and the microprocessor in order to receive data, transmitted by the microprocessor to the correlation stage, and data supplied from the correlation stage, said data passing through the set of registers being formed of signals of a frequency lower than or equal to the frequency of message signals, so that the microprocessor can perform the tasks of calculating the position, velocity and time without any intervention as regards the synchronisation and correlation tasks.

2. A radio-frequency receiver according to claim 1, wherein the controller acts on control loops of a pseudo random noise code phase and a carrier frequency in a bit-parallel architecture.

3. A radio-frequency receiver according to claim 1, wherein each correlator is formed (1) of a first multiplier stage for multiplying the intermediate signals with, on the one hand, the cosine minus i times the sine of a replica of a carrier frequency generated digitally in the correlation stage, and with, on the other hand, the minus sine minus i times the cosine of this carrier frequency replica to provide as an output a first in-phase signal and a second quarter-phase signal, and (2) of a second multiplier stage for correlating the first signal with, on the one hand, a late replica of a satellite pseudo random noise code signal digitally generated in the correlation stage, and with, on the other hand, an early replica of the satellite pseudo random noise code signal and to correlate the second signal with, on the one hand, late replica of the satellite pseudo random noise code signal and, on the other hand, an early replica of the satellite pseudo random noise code signal, the four signals leaving the second multiplier stage being each passed into a respective integrator counter to provide four in-phase and quarter-phase code signals each distributed over at least 8 bits in a pseudo random noise code phase correction loop, and the sum of the two in-phase code signals and the sum of the two quarter-phase code signals providing two carrier signals each distributed over at least 8 bits in a carrier frequency correction loop.

4. A radio-frequency receiver according to claim 3, wherein the early signals have a phase offset of a half chip with respect to the late signals.

5. A radio-frequency receiver according to claim 3, wherein the code correction loop includes in succession a code loop discriminator, a code loop filter, a 28-bit numerically controlled oscillator, and a pseudo random noise code generator connected to a 2-bit register supplying the early and late replicas to the second multiplier stage.

6. A radio-frequency receiver according to claim 3, wherein the carrier frequency correction loop includes in succession a carrier loop discriminator, a carrier loop filter, a 24-bit numerically controlled oscillator and two units for providing to the first multiplier stage of the cosine and the sinus of the replica of the carrier frequency corrected by the numerically controlled oscillator.

7. A radio-frequency receiver according to claim 1, wherein it includes 12 channels with a correlator and a controller for each of them.

8. A radio-frequency receiver according to claim 1, wherein a first part of the correlator and the controller of each channel is clocked by a first clock signal provided by a quartz oscillator housed in the reception and shaping stage, and wherein a second part of the correlator and the controller is clocked by a second clock signal, the frequency of the first clock signal being 16 times greater than the frequency of the second clock signal.

9. A radio-frequency receiver according to claim 1, wherein a set of registers is provided for each channel.

10. A radio-frequency receiver according to claim 9, wherein the correlation stage, the set of registers, and the microprocessor are made in a single semiconductor substrate.

11. A watch including a radio-frequency receiver according to claim 1, wherein the radio-frequency receiver is housed in the case of the watch and is powered by an energy accumulator or a battery also used for powering electronic components for horological functions.

12. A low power radio-frequency receiver including an antenna for receiving radio-frequency signals originating from satellites, a reception and shaping stage for the radio-frequency signals provided by the antenna, a correlation stage formed of several channels which each include a correlator, said correlation stage receiving intermediate signals shaped by the receiption stage, a microprocessor connected to the correlation stage and adapted to calculate X, Y and Z position, velocity and time data as a function of data extracted, after correlation, from the radio-frequency signals transmitted by the satellites, wherein, in each channel, a controller, including a digital signal processing algorithm, is associated with the correlator to allow all synchronisation tasks to be performed autonomously for acquiring and tracking a satellite when the channel is set in operation, wherein the controller acts on control loops of the pseudo random noise code phase and a carrier frequency in a bit-parallel architecture, and wherein at least a set of data input and output registers is placed at the interface between the correlation stage and the microprocessor in order to receive data transmitted by the microprocessor to the correlation stage and data supplied from the correlation stage, said data passing through the set of registers being formed of signals of a frequency lower than or equal to the frequency of message signals; so that the microprocessor can perform the tasks of calculating the position, velocity and time without any intervention as regards the synchronisation and correlation tasks.

13. A low power radio-frequency receiver including an antenna for receiving radio-frequency signals originating from satellites, a reception and shaping stage for the radio-frequency signals provided by the antenna, a correlation stage formed of several channels which each include a correlator, said correlation stage receiving intermediate signals shaped by the reception stage, a microprocessor connected to the correlation stage and adapted to calculate X, Y and Z position, velocity and time data as a function of data extracted, after correlation, from the radio-frequency signals transmitted by the satellites, wherein, in each channel, a controller, including a digital signal processing algorithm, is associated with the correlator to allow all synchronisation tasks to be performed autonomously for acquiring and tracking a satellite when the channel is set in operation, and wherein at least a set of data input and output registers is placed at the interface between the correlation stage and the microprocessor in order to receive data, transmitted by the microprocessor to the correlation stage, and data supplied from the correlation stage, said data passing through the set of registers being formed of signals of a frequency lower than or equal to the frequency of message signals, so that the microprocessor can perform the tasks of calculating the position, velocity and time without any intervention as regards the synchronisation and correlation tasks, wherein a first part of the correlator and the controller of each channel is clocked by a first clock signal provided by a quartz oscillator housed in the reception and shaping stage, and wherein a second part of the correlator and the controller is clocked by a second clock signal, the frequency of the first clock signal being 16 times greater than the frequency of the second clock signal.

14. A watch including a low power radio-frequency receiver including an antenna for receiving radio-frequency signals originating from satellites, a reception and shaping stage for the radio-frequency signals provided by the antenna, a correlation stage formed of several channels which each include a correlator, said correlation stage receiving intermediate signals shaped by the reception stage, a microprocessor connected to the correlation stage and adapted to calculate X, Y and Z position, velocity and time data as a function of data extracted, after correlation, from the radio-frequency signals transmitted by the satellites, wherein, in each channel, a controller, including a digital signal processing algorithm, is associated with the correlator to allow all synchronisation tasks to be performed autonomously for acquiring and tracking a satellite when the channel is set in operation, and wherein at least a set of data input and output registers is placed at the interface between the correlation stage and the microprocessor in order to receive data, transmitted by the microprocessor to the correlation stage, and data supplied from the correlation stage, said data passing through the set of registers being formed of signals of a frequency lower than or equal to the frequency of message signals, so that the microprocessor can perform the tasks of calculating the position, velocity and time without any intervention as regards the synchronisation and correlation tasks, wherein the radio-frequency receiver is housed in the case of the watch and is powered by an energy accumulator or a battery also used for powering electronic components for horological functions.

* * * * *